P. KENNEDY.
DYNAMO SUSPENSION ON CAR TRUCKS.
APPLICATION FILED NOV. 19, 1913.

1,269,822.

Patented June 18, 1918.
4 SHEETS—SHEET 1.

P. KENNEDY.
DYNAMO SUSPENSION ON CAR TRUCKS.
APPLICATION FILED NOV. 19, 1913.

1,269,822.

Patented June 18, 1918.

WITNESSES:
H. Johnson
C. B. Schrader

INVENTOR
Patrick Kennedy
BY
Pennie Davis & Goldsbury
ATTORNEYS

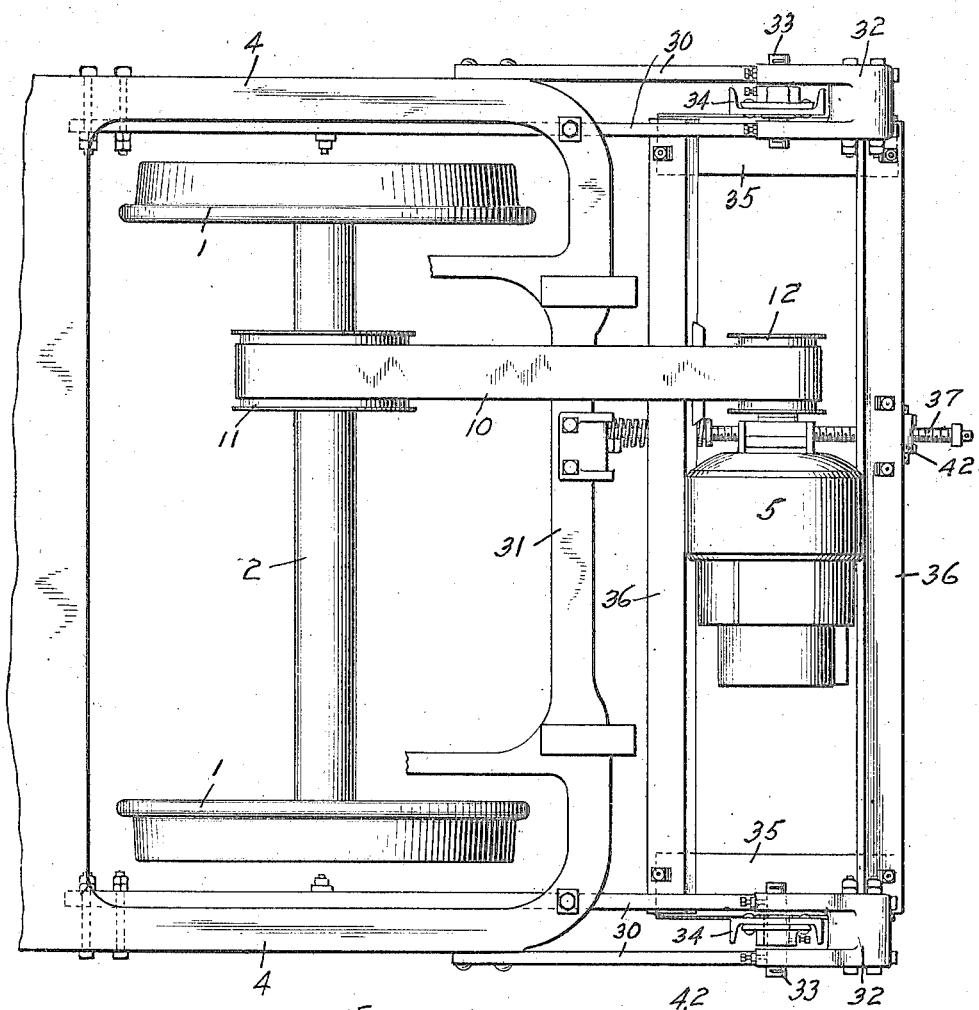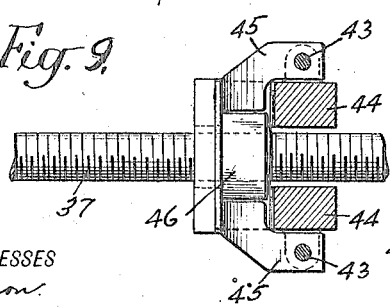

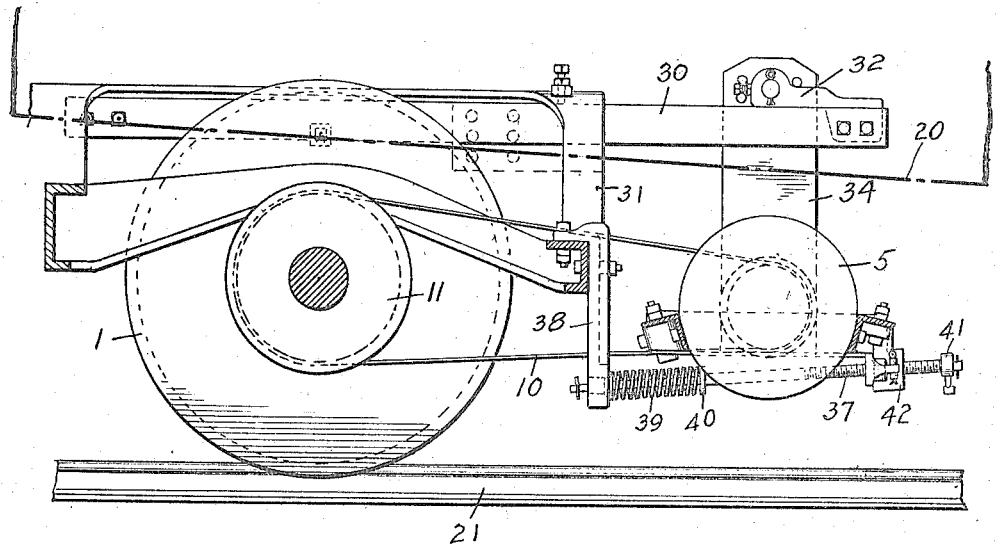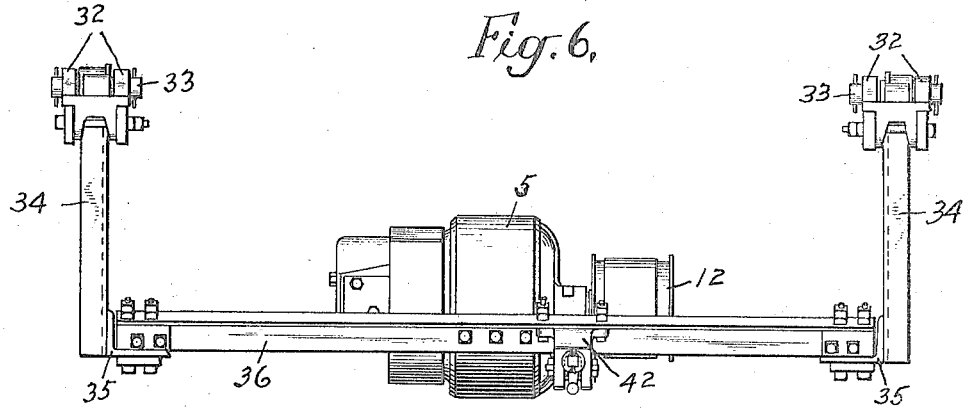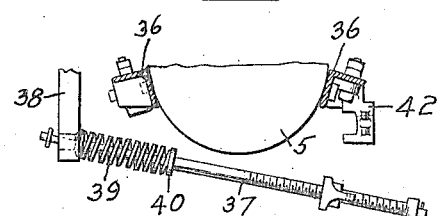

UNITED STATES PATENT OFFICE.

PATRICK KENNEDY, OF BROOKLYN, NEW YORK, ASSIGNOR TO CONSOLIDATED RAILWAY ELECTRIC LIGHTING AND EQUIPMENT CO., OF NEW YORK, N. Y., A CORPORATION OF MAINE.

DYNAMO SUSPENSION ON CAR-TRUCKS.

1,269,822.   Specification of Letters Patent.   Patented June 18, 1918.

Application filed November 19, 1913. Serial No. 801,770.

*To all whom it may concern:*

Be it known that I, PATRICK KENNEDY, a citizen of the United States, residing at No. 177 Putnam avenue, Brooklyn, county of Kings, State of New York, have invented certain new and useful Improvements in Dynamo Suspensions on Car-Trucks; and I do hereby declare the following to be a full, clear, and exact description of the invention, such as will enable others skilled in the art to which it appertains to make and use the same.

The present invention relates to dynamo suspensions on car trucks for supporting a dynamo in position to be driven as a generator from the axle of a truck, or as a motor to drive the axle, and particularly to a dynamo suspension of novel construction well adapted for supporting a generator driven from the axle for supplying current to a storage battery and lamps in a car lighting system, wherein the car body may, if desired, be provided on its underside with a longitudinal center sill having vertical and horizontal movements relatively to the dynamo suspension. The accommodation for the longitudinal center sill above the suspension and the required clearance relatively to the service rails below the suspension are both met in my present construction by attaching the dynamo suspension to the dynamo at places intermediate of its height, whereas strength and durability are attained by providing a well shaped supporting frame rigidly fastened to the dynamo and hung in a single bearing at each side carried by the truck in such manner that the suspension together with the dynamo rigidly suported therein may swing toward and away from the axle. Furthermore, I show herein an improved form of automatic belt-tensioning means requiring but one tensioning device so arranged that it may easily be moved out of the way to permit the removal of the dynamo armature and the armature pulley. My improvements simplify the dynamo suspension and associated parts in a practical manner, and also materially aid in more efficient operation over a prolonged period by reducing the number of friction and wearing parts to a minimum.

In the accompanying drawings illustrating two embodiments within my invention of a dynamo suspension for supporting a generator for a car lighting system in position to be driven from the axle of the truck by a belt, as an example.

Fig. 4 represents a top plan view of the preferred embodiment, wherein the dynamo suspension is of different form, but as in Fig. 1, it swings in two suspension bearings carried by longitudinal extensions of the outer side sills of the truck, and wherein an automatic tensioning device of novel construction is used;

Fig. 5 represents a longitudinal sectional elevation of Fig. 4;

Fig. 6 represents a front elevation of Fig. 4;

Fig. 7 represents a view of the belt tensioning device dropped downward to a position for removing the dynamo armature and pulley;

Fig. 8 represents an enlarged front elevation, partly in section, of the belt tensioning device; and Fig. 9 represents a section on line 9—9 of Fig. 8.

Figure 1:
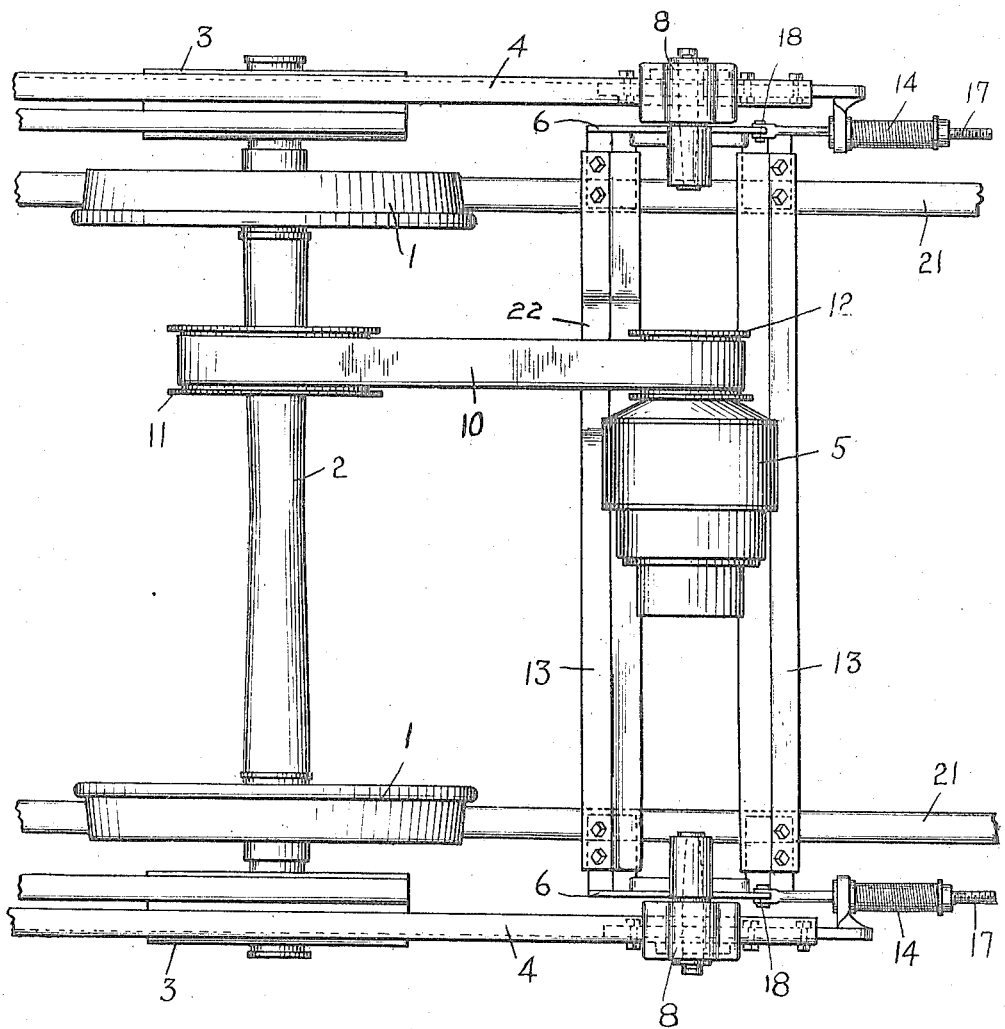
Figure 1 represents a top plan view of the dynamo suspension and a part of the truck, wherein the usual end sill at that end of the truck is omitted, although it may be used, if desired.

The trucks shown in the drawings are of the cast steel swivel type provided with wheels 1 fastened on two or more rotatable axles 2, and the journal boxes 3 therefor.

Figure 2:
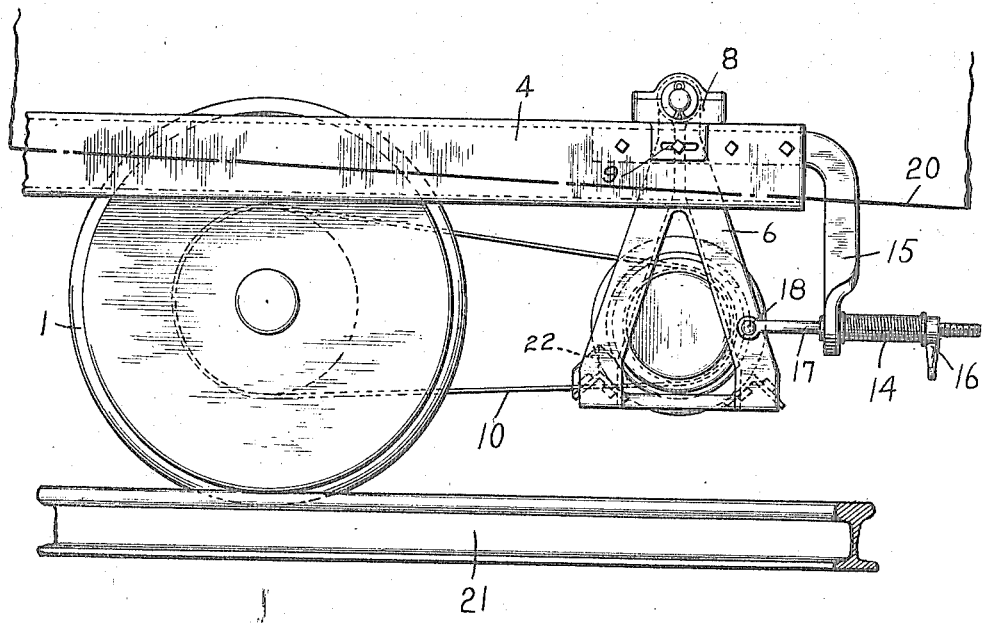
Fig. 2 represents a side elevation of Fig. 1.
Figure 3:
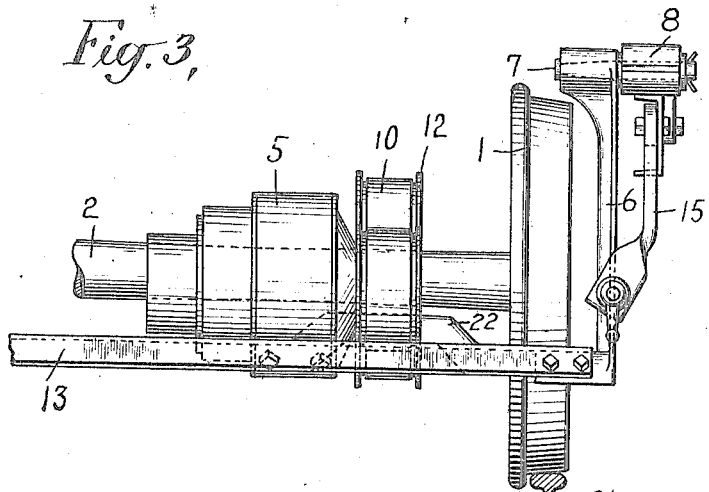
Fig. 3 represents an end elevation, partly broken away, of Fig. 1.

In the modification shown in Figs. 1, 2 and 3, the side sills 4 are outside the wheels, and longitudinal extensions integral therewith on the dynamo end of the truck extend for a distance from the axle beyond the usual location of the end sill. Although an end sill may be provided, if desired, it is omitted in this modification, but there is provided instead a dynamo suspension which is sufficiently rigid and strong to serve this purpose also. The suspension for the dynamo 5 comprises two structural steel end frames 6, of inverted V-shape, located just within the extension of the outer side sills, each of which carries a journal 7 mounted for swinging movements in a bearing 8 carried by the extension. Each of the bearings 8 is provided with an elongated slot 9 so as to be held in any individually adjusted position on the extension of the end sill by a bolt, as shown. By these means the longitudinal distance between the axle 2 and the dynamo 5 may be adjusted to accommodate the desired length of driving belt and to effect horizontal alinement of the truck and dynamo axles. The vertical alinement of these two axles may be obtained by placing shims under the bearings, or in any other suitable way.

The outer end of each of the depending arms of the end frame 6 has an inwardly projecting angle member to which is fastened one end of an angle section supporting member 13 which extends transversely across the truck at the proper elevation. Both of these transverse members are fastened rigidly to the dynamo intermediate of its height so as to support the dynamo in suitable driving position. The inside transverse member 13 is bent up at 22 to permit the uninterrupted passage of the driving belt 10.

The adjustable springs 14 automatically regulate the belt tension to take care of momentary fluctuations by swinging the dynamo suspension and the dynamo as a unit in the bearings 8, one end of each of these springs acting against a member 15, which is rigidly fixed to the truck as shown, while the other end presses against the adjustable nut 16 on the rod 17, which is pivotally connected at 18 to the end frame of the dynamo suspension.

In the modification shown in Figs. 4 to 9, the extensions of the side sills 4 are not integral therewith, as in the previous modification, but the longitudinal extensions 30 are bolted on the two sides of the outer side sills and form separated arms at each side of the truck extending beyond the end sill 31. This end sill may be omitted, if desired, by making the dynamo suspension of sufficient rigidity to serve this purpose also. The suspension bearings 32 are bolted to the extensions 30 so as to carry the journals 33 and thereby support the end frames 34 of the dynamo suspension between the arms. The bearings 32 may be provided with slots, as shown in the previous modification, to permit the adjustment of the individual bearings toward and from the axle of the truck, and shims or other means may be provided for attaining vertical alinement of the armature shaft and the axle 2 of the truck. Each end frame 34 extends between the separated arms 30, and is supported in the bearing 32 by the journal 33. The member 35 having an inwardly projecting flange is fastened to each end frame, and to these flanges are bolted cradle members 36, which extend across the truck and support the dynamo 5 in position to be driven from the axle 2 by the belt 10. That member 36 which is adjacent the end sill 31 is shaped near the armature pulley 12 so that it does not interfere with the uninterrupted passage of the belt, and both of the cradle members are rigidly fastened to the dynamo at places intermediate of its height, as shown particularly in Fig. 6.

In this case, a single spring tensioning device is provided for automatically regulating the belt tension, and this device is arranged in proximity to the belt so as to be well adapted for its purpose. The rod 37 is passed through a comparatively large hole in the depending arm 38 which is bolted to the end sill 31, and the end of this rod carries an enlarged head portion as shown, the arrangement being such that the rod fits loosely in the hole so as to be capable of swinging therein to the required angle of inclination, but is prevented by the head piece from being pulled out of the hole. The spring 39 is compressed between the depending member 38 and the fixed collar 40 to an adjustable amount by the nut 41. The rod 37 is disengageably held in the bracket 42, which is fixed to the cross bar 36, by means of the cotter-pins 43 passing through the side extensions 44 of the bracket and the side extensions 45 of the loosely fitting sleeve 46. In order to permit the removal of the dynamo armature and the pulley 12, the cotter-pins 43 are removed, the sleeve 46 is forced away from the bracket 42, and the rod 37 is dropped down out of the way as indicated in Fig. 7.

The position in elevation of the center sill of the car body is indicated in Figs. 2 and 5 by the broken lines 20. Both of the foregoing embodiments are so arranged that there is sufficient clearance between the bottom of this center sill and the top of the dynamo to provide for all vertical and horizontal swinging movements of the center sill; and furthermore, there is sufficient clearance between the top of the service rails 21 and the bottom of the standard size generator used for car lighting systems on railway cars to meet the requirements in this respect also. In both of the modifications shown herein, the dynamo suspension is hung in two bearings, one supported on each side of the truck, and these bearings constitute the only places at which friction and wear occur.

Having thus described my invention, what I claim is:

1. The combination with a dynamo and a car truck having extended side sills, of a swinging dynamo suspension carried by the extended side sills, said suspension being rigidly fastened to the dynamo and being journaled for swinging movements about an axis above the top line of the dynamo; substantially as described.

2. The combination with a dynamo and a car truck having extended side-sills, of a dynamo suspension comprising two endframes each pivotally supported in a single bearing carried by the extended side-sill at that side of the truck and above the top line of the dynamo, and transverse members fastened to the end-frames and adapted to support the dynamo in position to be driven from the axle of the truck; substantially as described.

3. The combination with a dynamo and a car truck having extended side-sills, of a dynamo suspension comprising two endframes each pivotally supported in a single bearing carried by the side-sill at the side of the truck and above the top line of the dynamo, and transverse members rigidly fastened to the end-frames and to the dynamo to support the dynamo in position to be driven from the axle of the truck; substantially as described.

4. Means for suspending a dynamo from a car truck, comprising extended side sills, a suspension bearing block supported upon each extended side sill above the top line of the dynamo, a bearing pin in each block, transverse suspension members rigidly secured to the dynamo and end frames rigid with the transverse members and hung from the side pins, whereby the transverse members, the end frames and the dynamo move as a unit.

5. The combination with a dynamo, and a car truck having extended side-sills; of a dynamo suspension comprising two endframes each pivotally supported in a single bearing carried by the side-sill at that side of the truck and above the top line of the dynamo, transverse members rigidly fastened to the end-frames and to the dynamo to support the dynamo in position to be driven from the axle of the truck; and automatic tensioning means for swinging the dynamo suspension and the dynamo as a unit in the bearings to automatically regulate the belt tension; substantially as described.

6. The combination with a dynamo, and a car truck having longitudinal extensions fastened on the two sides of the side sills and forming separated arms on each side of the truck, of a dynamo suspension having at each side an end frame hung between the arms and carried in a single bearing supported by the arms, and also having transverse members extending across the truck between the end frames to form a cradle for supporting the dynamo in position to be driven from the axle of the truck; substantially as described.

7. Means for suspending a dynamo from a car truck comprising extended side sills, a suspension bearing block supported by each extended side sill, a bearing pin in each block, transverse suspension members rigidly secured to the dynamo at opposite sides of and above the bottom line of the dynamo, and end frames rigid with the transverse members and hung from the side pins, whereby the transverse members, the end frames and the dynamo move as a unit.

8. The combination with a car truck having an end bolster of a dynamo suspension comprising side sills extended beyond the bolster, a suspension bearing block suspended by each of said extensions, a bearing pin in each block, transverse suspension members rigidly secured to the dynamo, end frames rigid with the transverse members and hung from the said pins, whereby the suspension structure, consisting of the transverse members and the end frames, and the dynamo, may move as a unit, and a spring belt-tensioning device acting between the end bolster and the suspension structure.

9. The combination with a dynamo and a car truck, of a swinging dynamo suspension carried by the truck for supporting the dynamo in position to be driven from the axle of the truck by a belt, a spring tensioning device arranged in proximity to the belt for automatically regulating the belt tension, connecting means for connecting the belt tensioning device to the truck, and connecting means for connecting the tensioning device to the dynamo suspension, one of said connecting means being disengageable and the other providing for a swinging movement of the tensioning device so that one end of the belt tensioning device may be swung around the other end in order to permit removal of the dynamo armature or pulley; substantially as described.

10. The combination with a dynamo and a car truck having suspension bearings located above the top line of the dynamo, of a swinging dynamo suspension comprising a structure journaled in said bearings and rigidly fastened to the dynamo intermediate of its height to swing therewith as a unit; substantially as described.

11. The combination with a dynamo and a car truck having extended side sills and also having bearings supported by the side sills above the top line of the dynamo, of a swinging dynamo suspension comprising a structure journaled in said bearings and rigidly fastened to the dynamo to swing therewith as a unit; substantially as described.

In testimony whereof I affix my signature, in presence of two witnesses.

PATRICK KENNEDY.

Witnesses:
J. L. WATSON,
F. R. STAATS.